United States Patent [19]
Farrington et al.

[11] Patent Number: 5,550,458
[45] Date of Patent: Aug. 27, 1996

[54] LOW-LOSS SNUBBER FOR A POWER FACTOR CORRECTED BOOST CONVERTER

[75] Inventors: Richard W. Farrington, Mesquite; William P. Gardiner, Dallas, both of Tex.

[73] Assignee: Lucent Technologies Inc., Murray Hill, N.J.

[21] Appl. No.: 251,163

[22] Filed: May 31, 1994

[51] Int. Cl.⁶ ........................................... G05F 1/56
[52] U.S. Cl. ............................... 323/222; 323/282
[58] Field of Search ................. 363/37, 101; 323/222, 323/282, 259, 344

[56] References Cited

U.S. PATENT DOCUMENTS

| | | | |
|---|---|---|---|
| 4,346,431 | 8/1982 | Steigerwald | 323/222 X |
| 4,533,986 | 8/1985 | Jones | 323/222 X |
| 5,095,261 | 3/1992 | Schoafs | 323/222 |
| 5,373,195 | 12/1994 | De Doncker et al. | 323/222 X |
| 5,432,431 | 7/1995 | Vinciarelli et al. | 323/222 |

*Primary Examiner*—Peter S. Wong
*Assistant Examiner*—Y. Jessica Han
*Attorney, Agent, or Firm*—Alfred G. Steinmetz

[57] ABSTRACT

A boost converter includes a snubber with finite but limited losses to minimize active power switching losses and minimize turn-off losses of the boost diode without generating any additional circulating energy losses. An inductor is connected so as to slow turn off of the boost diode and minimize reverse recovery losses. This inductor additionally minimizes the turn-on switching losses of the active power switch of the converter by providing for zero-current turn-on. A series connection of a finite resistor and a second diode is connected in shunt with the inductor/boost diode connection to prevent excessive voltage ringing across the active power switch by clamping its voltage during turn-off. A third diode is connected to the junction of the inductor and boost diode to prevent the voltage across the boost diode from ringing during the on interval of the active power switch.

9 Claims, 3 Drawing Sheets

5,550,458

LOW-LOSS SNUBBER FOR A POWER FACTOR CORRECTED BOOST CONVERTER

FIELD OF THE INVENTION

This invention relates to power converters and in particular to a boost converter used in power factor enhancement applications.

BACKGROUND OF THE INVENTION

Boost converters are used as active power circuits, as part of an off AC line powered power system, for controlling the wave shape of its input current as it is received from AC line power source. Wave shape control is provided by an active power switch of the converter which allows the current waveform to be constrained to approximate the wave shape of the input AC voltage waveform. The active power switch and the boost diode of the boost converter experience significant losses due to the reverse recovery loss characteristics of these devices as they are turned off.

Reduction of these losses is presently achieved by means of an auxiliary circuit shunting the active power switch and possessing an auxiliary active switch that conducts the input current at turn-off of the boost diode. The success of this approach is dependent on limiting the amount of power that the auxiliary power switch must handle. This necessity to limit the power handled by the auxiliary power switch and the complexity of the auxiliary circuit limits the application of this approach at higher power levels in excess of 1 KW.

An alternative approach uses a snubber circuit to minimize switching losses in the active power switch. Such an approach as illustrated by the lossless snubber disclosed in U.S. Pat. No. 5,260,607 comprises two additional inductors, three additional high voltage diodes and a capacitor. While this particular arrangement does minimize switching losses on the converter, it does so at the expense of circulating a significant level of energy in the converter due in part to induced ringing across the active switch during its off period. This circulating energy causes considerable power dissipation in the converter since the reactive components are not ideal but do indeed dissipate real energy. A second snubber circuit is required to damp the induced ringing in any realization of a practical circuit.

SUMMARY OF THE INVENTION

A boost converter, in accord with the principles of the invention, includes a snubber with finite but limited losses to minimize active power switching losses and minimize turn-off losses of the boost diode without generating any additional circulating energy losses. An inductor is connected so as to slow turn off of the boost diode and minimize reverse recovery losses. A series connection of a finite resistor and a second diode is connected in shunt with the inductor/boost diode connection to prevent excessive voltage ringing across the active power switch by clamping its voltage during turn-off. A third diode is connected to the junction of the inductor and boost diode to prevent the voltage across the boost diode from ringing during the on interval of the active power switch.

A buck converter is also disclosed which includes a snubber circuit for minimizing active power switching losses and minimize turn-off losses of the flyback diode. This snubber circuit includes a snubber inductor connected in series with the flyback diode and a series circuit of a resistor and diode connected in parallel with the flyback circuit. A diode connects a junction of the snubber inductor and flyback diode to the input.

DETAILED DESCRIPTION

Figure 1:
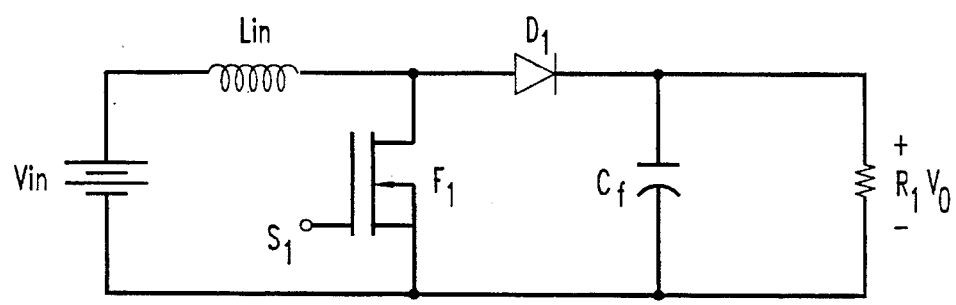
FIG. 1 is a circuit schematic of a conventional boost converter of the prior art.

A conventional boost converter, such as shown in the FIG. 1, accepts an input current Iin in response to an applied voltage Vin. The input current applies energy to the inductor Lin when the FET power switch F1 is periodically biased conducting inducing a current flow through the inductor Lin to the return lead returning to the negative/return pole of the battery voltage source Vin. Biasing the power switch F1 non-conducting causes inertial current due to stored energy to forward bias the boost diode D1 resulting in current flow to energize the load R1 and to charge the output filter capacitor Cf. As is readily apparent from the circuit schematic of FIG. 1 the induced reverse voltage of the boost inductor Lin due to the turn-off of the power switch F1 adds to the input voltage of Vin and hence the resultant output voltage Vo is greater than the input voltage of the source Vin. Control of the power switch F1 is by a PWM controller not shown which applies bias signals to the control input lead S1 of the power switch. The below described converters have a similarly controlled power switch.

This boost converter, while deskable due to its circuit simplicity, has operating characteristics that make it unsuitable for circuit applications requiring efficient operation. Such undesirable operating characteristics include the turn-off losses of the boost diode D1 induced by the inductor Lin and the switching losses of the FET power switch F1.

Figure 2:
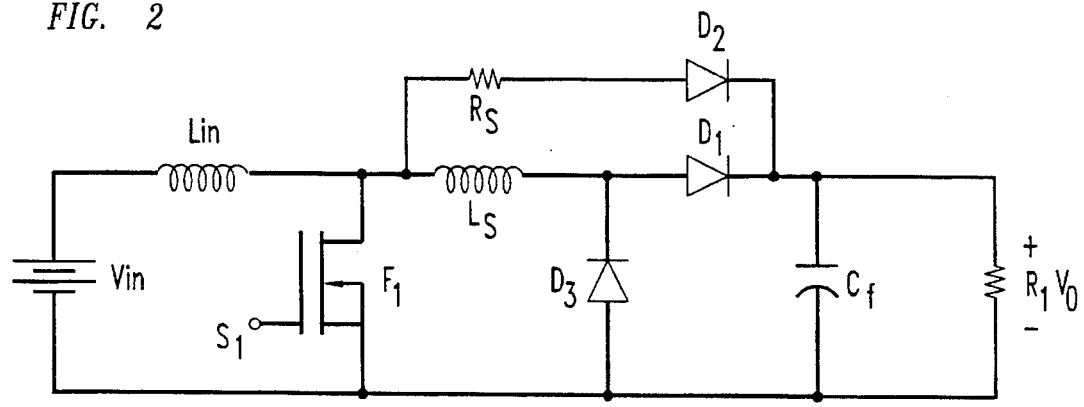
FIG. 2 is a circuit schematic of a boost converter including a low-loss snubber circuit according to the principles of the invention.
Figure 3:
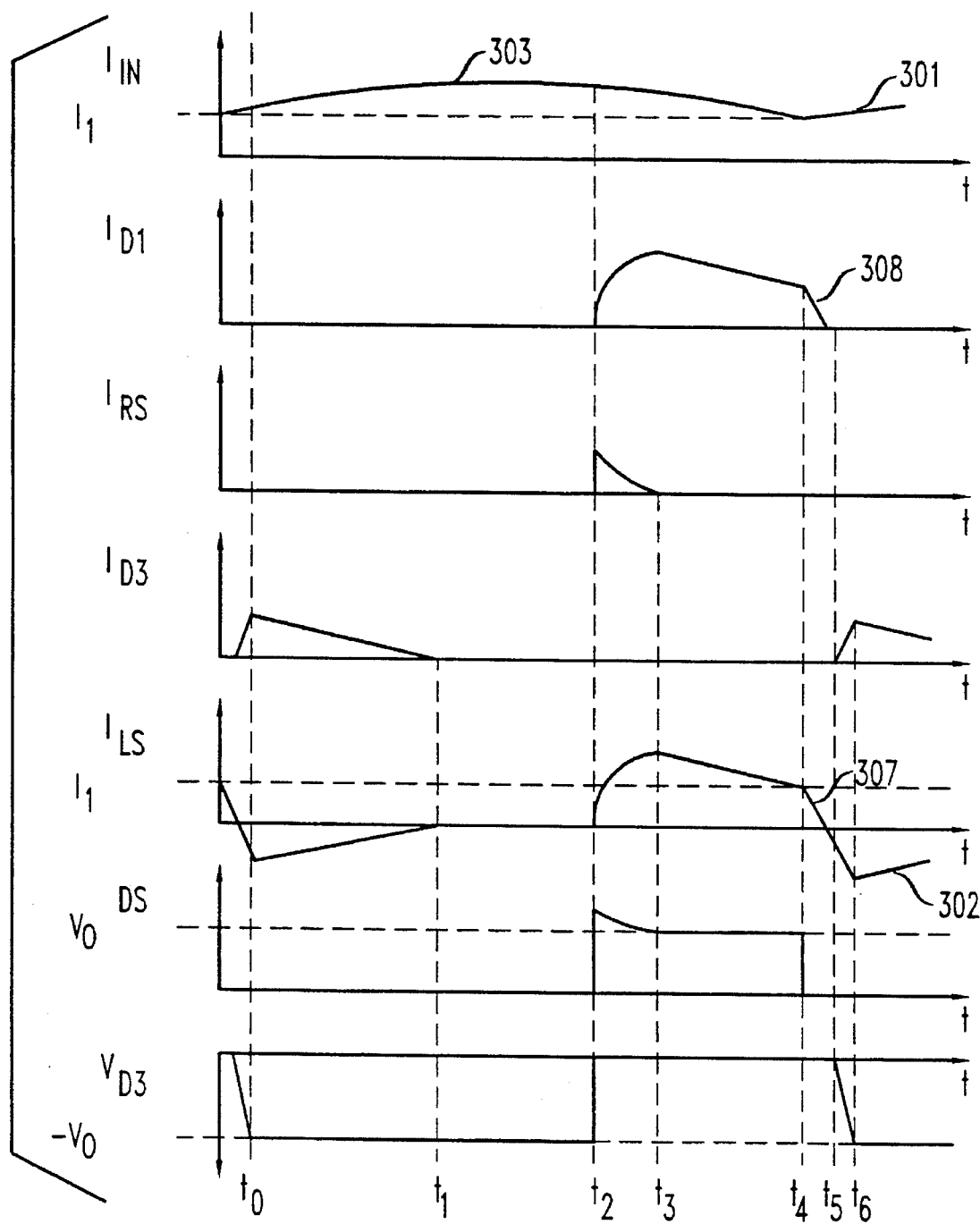
FIG. 3 shows waveforms for illustrating the operation of the boost converter of FIG. 2.

A boost converter, shown in the FIG. 2, includes a low-loss snubber circuit, which operates to minimize the turn-off losses of the boost diode D1 and reduce the switching losses of the FET power switch F1. A snubber inductor Ls is connected in series with the boost diode D1. In terms of inductance value the inductance of the boost inductor Lin is much larger than the inductance of the snubber inductor Ls to the extent that in the circuit operation the boost inductor may be considered to be a constant current source during a switching cycle interval. A series connected circuit, including a resistive impedance Rs and a snubber diode D2, is connected in shunt connection with the series connection of the snubber inductor Ls and the boost diode D1. A second snubber diode D3 connects a node common to the snubber inductor Ls and the boost diode D1 to the return lead which connects to the negative/return terminal of the input voltage source Vin. The snubber inductor Ls slows the turn off of the boost diode D1 and hence minimizes its reverse recovery losses. Turn-on switching losses, of the power switch F1, are minimized since the snubber inductor Ls prevents a rapid build up of current. The voltage across the FET power switch F1 is prevented from ringing due to the presence of the snubber inductor Ls by the series circuit comprising snubber resistor Rs and snubber diode D2 by clamping the voltage across the FET power switch F1 during turn-off to the value of the output voltage Vo of the converter. The output filter capacitor Cf has a capacitance sufficient to approximate a constant voltage source at the output voltage during a switching cycle interval. An understanding of the operation of the snubber circuit may be attained by reference to the circuit waveforms shown in the FIG. 2.

The waveforms disclosed in the FIG. 2 include the current waveform Iin of the input current to the boost converter, and the current waveform ID1 of current in the boost diode D1. The current waveforms IRS and ID3 graph the current flow in the series connected resistance Rs and the second snubber diode D3, respectively. The current flow through the snubber inductor Ls is shown by waveform ILS. The voltage waveforms of the snubber diode D2 and the second snubber diode D3 are shown by the waveforms VD1 and VD3 respectively. The timing marks t0 to t6 appearing at the bottom of the figure are common to all the waveforms.

Just subsequent to the timing mark t6 the FET power switch F1 and the diode D3 are both conducting. Diodes D1 and D2 are non-conducting. At this time interval (t6 to t0) the input current (shown by the current ramp 301 of waveform Iin) from the boost inductor Lin is returned to the source through the FET power switch F1. Existing current in the snubber inductor Ls (shown by ramp 302 of waveform ILS) is flowing in a negative direction through diode D3 and the FET power switch F1. This negative current is decaying toward a zero value.

Time t0 marks the beginning of a cycle occurring at the turn-on of the FET power switch F1. In the time interval between t0 and t1 the FET power switch F1 is conducting and the diodes D1, D2 and D3 are all turned off. Up until the timing mark t2 energy continues to be stored in the boost inductor Lin as indicated by the positive sloped ramp current ramp current 303 of current waveform Iin. At time t1 the energy stored in the snubber inductor Ls is totally dissipated and the diode D3 is biased non-conducting.

By the attainment of the timing mark t2 the FET power switch F1 has turned off and the current flow in the boost inductor Lin is transferred to the output, during the time interval defined by the timing marks t2 and t3, by the series circuit including the resistor Rs and the diode D2 since the current inertia of the snubber inductor Ls prevents current flow therein. The voltage drop across resistor Rs, during this time interval, forces a corresponding voltage drop across the snubber inductor Ls and causes a current to begin to flow through the snubber inductor Ls.

As the current ILS in the snubber inductor Ls increases the current in the resistor Rs correspondingly decreases. By the timing mark t3 the current IRS in the resistor Rs terminates and the diode D2 ceases current conduction. During the next time interval defined by the timing marks t3 to t4 the input current flows from the input inductor Lin to the output via the series connected snubber inductor Ls and the boost diode D1.

At the attainment of the timing mark t4 the FET power switch F1 is biased conducting. Since all the input current is at this timing mark flowing through the snubber inductor Ls the FET power switch F1 is turned on at substantially zero current. With the FET power switch F1 conducting, a resetting voltage, equal in magnitude to the output voltage, is developed across the snubber inductor Ls. This resetting voltage causes the current flow in the snubber inductor to decay in a linear manner, as shown by the slope 307 of the current waveform ILS. The current in the FET power switch F1 increases at an identical rate. This effect minimizes the turn-on switching losses of the FET power switch F1.

By attainment of the timing mark t5 the current in the snubber inductor Ls has decayed to a zero magnitude and the boost diode D1 turns off with a soft switched turn off in which the reverse recovery loss is minimized.

At timing mark t5 the diode D1 is turned off and its parasitic capacitance is charged through the snubber inductor Ls. The current through the snubber inductor Ls increases in the negative direction during this interval defined by the timing marks t5 to t6. The input current is returned to the input through the FET power switch F1. By the timing mark t6 the voltage across the boost diode D1 decreases to −V0 and the clamping diode D3 is biased conducting. At the attainment of the timing mark t6 the cycle of operation described above is repeated.

Figure 4:
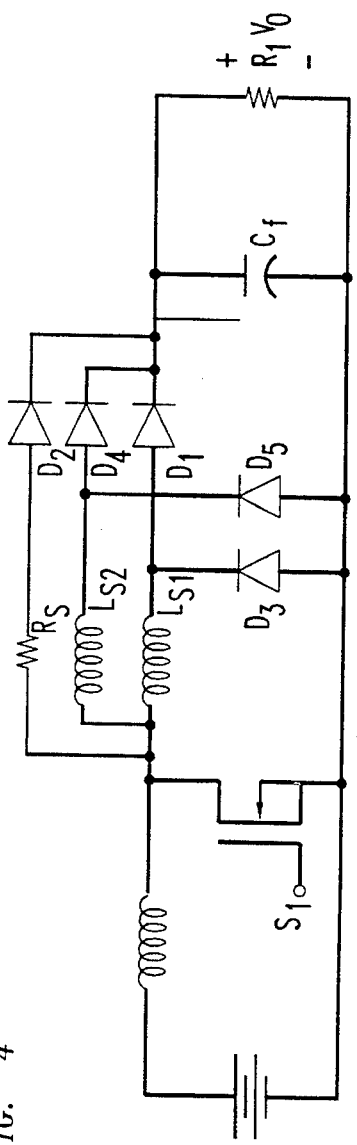
FIG. 4 is a circuit schematic of a boost converter including a low-loss snubber circuit for high power applications according to the principles of the invention.

For high power application the low-loss snubber is embodied with a plurality of parallel branches. A low loss with two branches is shown in the FIG. 4. In addition to the original low-loss snubber circuitry including the snubber inductor Ls1, the ringing clamp comprising the impedance Rs and the diode D2 and the diode D3 an added parallel branch is added which includes a second snubber inductor Ls2 and a diode D4. An added diode D5 connects the common node of the second snubber inductor Ls2 and the diode D4 to the return line returning to the input voltage source. The addition of the parallel second path containing Ls2 and D4 allows current to divide substantially equally between the first path containing Ls1 and D1 and the second path. The paralleling of the circuits effectively reduces the overall impedance and reduces the losses due to the dissipation loss of resistance Rs.

Figure 5:
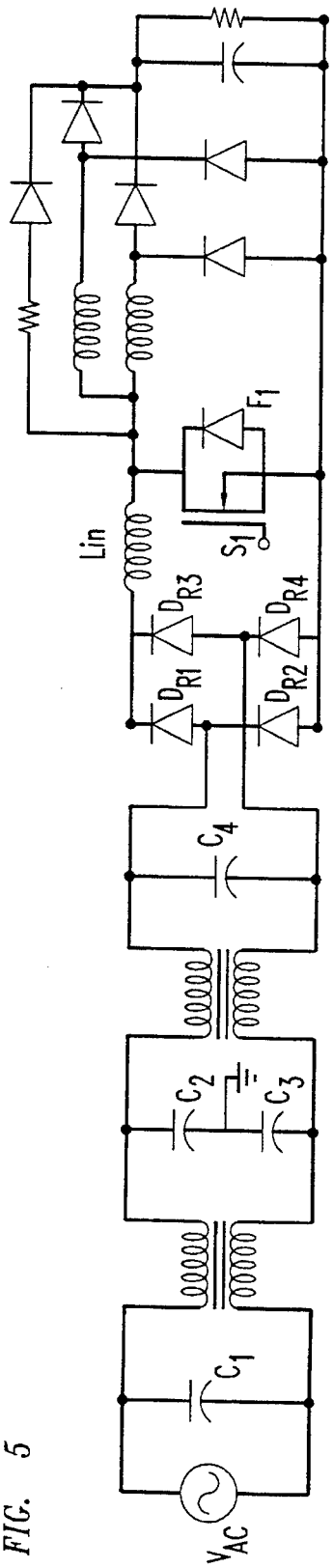
FIG. 5 is a detailed circuit schematic of a power rectifier circuit including a low-loss snubber circuit according to the invention.

A typical power system embodying a boost converter is shown schematically in the FIG. 5. An AC power source VAC is connected to charge an input capacitor C1 of a power rectifier system This capacitor operates in concert with the subsequent longitudinal inductor which feeds the balanced capacitors C2 and C3 balanced about ground. A subsequent longitudinal inductor connects these capacitors to the capacitor C4 shunting the input to a full wave rectifier comprising the rectifying diodes DR1, DR2, DR3 and DR4. The output of this full wave rectifier is applied to boost inductor Lin of the subsequent boost converter. This boost inductor is controlled by the active power switch F1 and is substantially the same as the boost circuit shown in the FIG. 4 and hence need not be redescribed herein.

Figure 6:
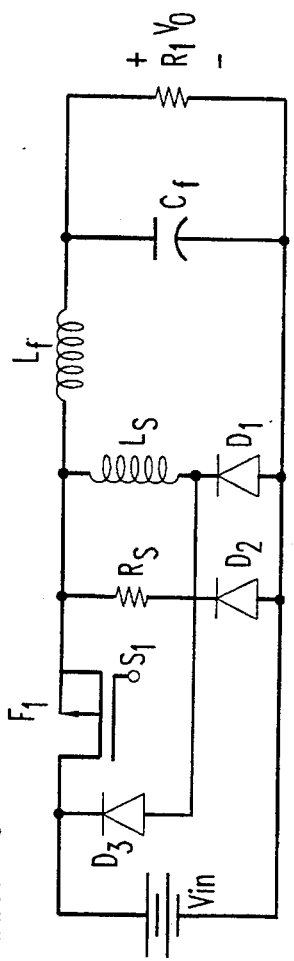
FIG. 6 is a circuit schematic of a buck converter including a low-loss snubber circuit according to the principles of the invention.

A buck converter shown in the FIG. 6 includes the input Vin connected to an output Vo by a series connected power switch Q1 and a filter inductor Lf. A flyback path of a series connected snubber inductor Ls and a flyback diode D1 provides current continuity to the filter inductor Lf when the power switch Q1 is non-conducting. A snubber circuit including the resistor Rs and the diode D2 is provided to provide control the voltage across the snubber inductor Ls and reduce switching losses in the power switch Q1.

While particular embodiments of the invention have been shown and described, it is to be understood that many variations thereof may be devised by those skilled in the art without departing from the spirit and scope of the invention.

We claim:

1. A boost converter, comprising:

an input and output;

a boost inductor connected to the input for storing energy;

an active power switch connected to draw current from the boost inductor when conducting;

a boost diode connected for conducting energy from the boost inductor to the output during non-conduction of the active power switch;

a second inductor connected to the boost diode to minimize its turn off losses;

a series connection of a finite resistor and a second diode connected in shunt with the second inductor/boost diode connection; and a third diode connected to a junction of the second inductor and the boost diode for limiting ringing across the boost diode during conduction of the active power switch.

2. A boost converter as claimed in claim 1, comprising:

an added series circuit comprising a third inductor and a fourth diode and the series circuit connected in parallel with the series connection; and a fifth diode connected to a junction of the third inductor and the fourth diode for limiting ringing across the boost diode during conduction of the active power switch.

3. A boost converter as claimed in claim 1, comprising:

the active power switch connected to conduct current from the input to a return lead connected to the input.

4. A boost converter as claimed in claim 1, comprising:

the finite resistance having a sufficient impedance to generate a voltage drop that initiates current flow in the second inductor upon cessation of current flow in the active power switch.

5. A power converter including:

an input and an output;

an energy storage inductor and a power switch periodically switched to couple DC voltage energy applied at the input to the energy storage inductor;

a diode connected to enable energy flow stored in the energy storage inductor to the output during non-conduction of the power switch;

a snubber inductor connected in series with the diode;

a second diode and a resistor connected in series and the series connection of the second diode and resistor connected in parallel with the series connection of the snubber inductor and the diode;

a third diode connecting a common junction of the snubber inductor and the diode to the input.

6. A power converter as claimed in claim 5, further including:

the energy storage inductor and the diode connected in series to connect the input to the output and the power switch connected to join a junction of the energy storage inductor and the diode to the input.

7. A power converter as claimed in claim 5, further including:

the power switch connected in series with the energy storage inductor to connect the input to the output and the diode connected in series connection with the snubber inductor and the series connection connected to connect a junction of the power switch and the energy storage inductor to the input.

8. A power converter as claimed in claims 6 or 7, further including:

a second snubber inductor connected in series with a fourth diode and the series connection of the second snubber inductor and fourth diode being connected in parallel with the series connection of the snubber inductor and the diode.

9. A power converter as claimed in claim 8, further including:

an input rectifier connected to couple an AC line to the input.

* * * * *